United States Patent [19]

Ohya et al.

[11] Patent Number: 5,041,336
[45] Date of Patent: Aug. 20, 1991

[54] MAGNETIC RECORDING MEDIUM USING A BINDER RESIN CONTAINING A POLAR GROUP, AND A LUBRICANT SYSTEM COMPRISING TWO TYPES OF FATTY ACID ESTERS AND ONE FATTY ACID

[75] Inventors: Takao Ohya; Yasuo Nishikawa; Akihiro Matsufuji; Akira Kasuga; Kiyomi Ejiri, all of Kanagawa, Japan

[73] Assignee: Fuji Photo Film Co., Ltd., Kanagawa, Japan

[21] Appl. No.: 251,437

[22] Filed: Sep. 30, 1988

[30] Foreign Application Priority Data

Sep. 30, 1987 [JP] Japan .................. 62-246323

[51] Int. Cl.$^5$ ............................................. G11B 23/00
[52] U.S. Cl. .................................. 428/423.1; 428/900; 428/694; 428/695; 428/424.6; 428/480
[58] Field of Search ................. 428/900, 694, 423.1, 428/424.6, 480, 695

[56] References Cited

U.S. PATENT DOCUMENTS

| | | | |
|---|---|---|---|
| 4,448,842 | 5/1984 | Yamaguchi et al. | 428/329 |
| 4,465,737 | 8/1984 | Miyatuka et al. | 428/339 |
| 4,652,500 | 3/1987 | Ejiri et al. | 428/695 |
| 4,690,864 | 9/1987 | Funahashi et al. | 428/336 |
| 4,701,372 | 10/1987 | Akiyama et al. | 428/323 |
| 4,731,292 | 3/1988 | Sasaki et al. | 428/425.9 |
| 4,741,959 | 5/1988 | Abe et al. | 428/403 |

Primary Examiner—Merrell C. Cashion, Jr.
Assistant Examiner—Stevan A. Resan
Attorney, Agent, or Firm—Sughrue, Mion, Zinn, Macpeak & Seas

[57] ABSTRACT

A magnetic recording medium comprising a non-magnetic support having provided thereon a magnetic layer comprising a ferromagnetic powder dispersed in a binder,
wherein said binder comprises a polymer containing a polar group selected from —SO$_3$M, —OSO$_3$M, —COOM,

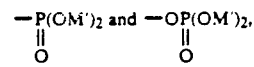

where M represents a hydrogen atom, Li, Na, K or NR$_4$ where R represents a hydrogen atom or an alkyl group, and M' represents a hydrogen atom, Li, Na, K, an alkyl group or NR$_4$ where R represents a hydrogen atom or an alkyl group, and
said magnetic layer contains at least one fatty acid ester compound represented by formula (I), at least one fatty acid ester compound represented by formula (II), and at least one fatty acid having from 11 to 35 carbon atoms:

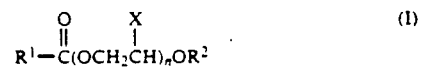

wherein R$^1$ represents a linear or branched chain hydrocarbon group having from 11 to 35 carbon atoms, R$^2$ represents a linear or branched chain hydrocarbon group having from 1 to 8 carbon atoms or a phenyl group, X represents a hydrogen atom or a methyl group, and n represents an integer of from 2 to 200;

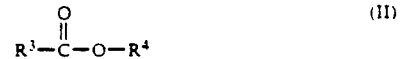

wherein R$^3$ represents a linear or branched chain hydrocarbon group having from 11 to 35 carbon atoms and R$^4$ represents a linear or branched chain hydrocarbon group having from 1 to 8 carbon atoms.

7 Claims, No Drawings

MAGNETIC RECORDING MEDIUM USING A BINDER RESIN CONTAINING A POLAR GROUP, AND A LUBRICANT SYSTEM COMPRISING TWO TYPES OF FATTY ACID ESTERS AND ONE FATTY ACID

FIELD OF THE INVENTION

This invention concerns the improvement of magnetic recording media which comprise a non-magnetic support and a magnetic layer.

BACKGROUND OF THE INVENTION

Magnetic recording media in which a magnetic layer comprising a dispersion of a ferromagnetic powder comprising a circular crystals of $\gamma$-$Fe_2O_3$, cobalt containing magnetic iron oxide, $CrO_2$ etc. in a binding agent (binder) is provided on a non magnetic support are generally used as magnetic recording media (also referred to below as magnetic tapes) for audio, video and computer applications etc.

However, more recently a demand has arises for higher recording densities on magnetic recording media and the use of ferromagnetic alloy powders of which the main components are metals such as iron, nickel and cobalt etc. in place of the ferromagnetic powders used conventionally has a become generalized. The ferromagnetic alloy powders enable high density recording to be achieved since they have a high coercive force (Hc) and a high residual flux density (Br), and they are ideal as ferromagnetic materials for magnetic recording media in cases where high density recording is required.

In the case of video tapes in particular. it is necessary to achieve very high density recording in view of the methods such as the shortening of the recording wavelength and the narrowing of the track width which have been used. Video tapes in which ferromagnetic alloy powders are used in place of the conventional iron oxide based ferromagnetic powders can be used for this purpose.

When a ferromagnetic alloy powder is used, higher density recording can be achieved by rendering the surface of the magnetic layer smoother, and it is known that the electromagnetic conversion characteristics of magnetic recording media can be improved in this way.

However, if the surface of the magnetic layer is made smoother, then the coefficient of friction for the contact between the magnetic layer and the apparatus in the video tape running system is increased and the magnetic layer of the magnetic recording medium is liable to be damaged in a short period of time in use or it may tend to peel away in use. With video tapes in particular, the magnetic medium runs at high speed while in contact with the video head and so ferromagnetic powder is easily dropped from the magnetic layer and this is a cause of magnetic head blockage (clogging). Moreover, the running conditions are especially severe in the still mode. Hence, it is desirable that the running durability of the magnetic layers of video tapes should be improved.

Measures for improving the running durability of magnetic layers which have been suggested in the past have included the addition of abrasive agents (hard particles) such as corundum, silicon carbide, chromium oxide etc. to the magnetic layer, but it is difficult to realize an improved effect with the addition of abrasive agents to a magnetic layer with the intention of improving the running durability of the magnetic layer unless the abrasive agent is added in large quantities. However, magnetic layers to which large amount of abrasive agents have been added cause marked wearing of magnetic heads and it is contrary to the effect to the magnetic layer be rendered smoother so as to the electromagnetic conversion characteristics be improved. Thus, this cannot be said to be a preferred method.

Furthermore, fatty acids and esters of fatty acid and aliphatic alcohol have been added to magnetic layers as lubricants in order to reduce the coefficient of friction.

However, with the recent advent of the portable video tape recorder it is to be expected that video tapes will be used under more severe conditions at low temperatures and under conditions of high temperature and humidity. Hence, the video tapes must be so stable that there is no change in their running durability under the various conditions which can be envisaged. However, satisfactory running durability cannot be obtained with the conventional lubricants.

Rapid progress is being made with the miniaturization of recording media by compressing the recording wave-length and track width, especially in the case of video tapes and floppy disks, and ferromagnetic alloy powders are more useful than the conventional iron oxide based ferromagnetic powders. It is possible to obtain superior electromagnetic conversion characteristics by greatly reducing the size of the magnetic particles in this way, but it is difficult to obtain good running durability at the same time and improvement is desirable.

The use of diethylene glycol ester derivatives as lubricants provides one method of ameliorating these problems, and the use of combinations with polyurethane based resins, vinyl chloride based copolymers and epoxy based resins etc. as binding agents has been suggested (JP-A-59-227030, JP-B-57-46128). Furthermore, the use of combinations of oligoalkylene glycol ester derivatives and binding agents which have polar groups has also been suggested (JP-A 63-103419) (the term "JP-A" used herein means an "unexamined published Japanese patent application", and the term "JP-B" used herein means an "examined Japanese patent publication").

Some improvement in respect of the occurrence of head blocking under conditions of high humidity and in respect of the rise in the $\mu$ value (the coefficient of friction) which arises as a result of repeated running under room temperature conditions can be achieved by means such as those indicated above. However, even with such improvements, the still durability remains inadequate and they, cannot be said to provide a satisfactory performance, especially under low temperature conditions.

SUMMARY OF THE INVENTION

An object of this invention is to provide magnetic recording media in which both the electromagnetic conversion characteristics and the running durability are improved.

More precisely, an object of this invention is to provide magnetic recording media which have excellent electromagnetic conversion characteristics, with which there is little blocking even under conditions of high humidity, and which have excellent still durability under low temperature conditions.

Other objects and effects of this invention will be apparent from the following description.

The above objects of this invention is attained by a magnetic recording medium comprising a non-magnetic support having provided thereon a magnetic layer comprising a ferromagnetic powder dispersed in a binder, wherein said binder comprises a polymer containing a polar group selected from —SO$_3$M, —OSO$_3$M,

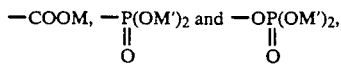

where M represents a hydrogen atom, Li, Na, K or NR$_4$ where R represents a hydrogen atom or an alkyl group, and M' represents a hydrogen atom, Li, Na, K, an alkyl group or NR$_4$ where R represents a hydrogen atom or an alkyl group, and said magnetic layer contains at least one fatty acid ester compound represented by formula (I), at least one fatty acid ester compound represented by formula (II), and at least one fatty acid having from 11 to 35 carbon atoms:

wherein R$^1$ represents a linear or branched chain hydrocarbon group having from 11 to 35 carbon atoms, R$^2$ represents a linear or branched chain hydrocarbon group having from 1 to 8 carbon atoms or a phenyl group, X represents a hydrogen atom or a methyl group, and n represents an integer of from 2 to 200;

wherein R$^3$ represents a linear or branched chain hydrocarbon group having from 11 to 35 carbon atoms and R$^4$ represents a linear or branched chain hydrocarbon group having from 1 to 8 carbon atoms.

DETAILED DESCRIPTION OF THE INVENTION

The magnetic recording media of this invention are made with fatty acid ester compounds which can be represented by the above mentioned formulae (I) and (II) and specified fatty acids as lubricants, and polymers which have specified polar groups. In this way it is possible to realize magnetic recording media with which there is no deterioration in the electromagnetic conversion characteristics, with which there is an improvement in that blocking of magnetic heads does not occur under conditions of high humidity and in connection with the rise in the value (coefficient of friction) on repeated running under room temperature conditions and which, moreover, have excellent still durability under low temperature conditions.

In particular, there is a marked improvement in still durability when saturated fatty acids and unsaturated fatty acids are used for the fatty acid.

The magnetic recording media of this invention have a basic structure comprising a non-magnetic support and a magnetic layer which contains a ferromagnetic powder which is provided upon the non-magnetic support.

The non-magnetic support which is used in the invention may be, for example, a synthetic resin film made of polyethyleneterephthalate, polypropylene, polycarbonate, polyethylenenaphthalate, polyamide, polyamideimide, polyimide etc., or a metal foil such as aluminum foil, stainless steel foil etc. Furthermore, the non magnetic support is generally from 2.5 to 100 μm thick, and preferably from 3 to 80 μm thick.

The non-magnetic support may be one which has a back layer (backing layer) provided on the side on which the magnetic layer, which is described hereinafter is not provided.

The magnetic recording media of this invention have a magnetic layer which contains a ferromagnetic powder positioned on the non-magnetic support as described above.

The inventors have carried out investigations in connection with compounds which provide adequate running durability when used as lubricants for the magnetic layers of magnetic recording media, and combinations of these compounds with binding agents. As a result of this work it has been discovered that magnetic recording media in which a polymer which has the aforementioned polar groups is used as a binding agent and which contain at least one fatty acid ester compound as shown by formula (I), at least one fatty acid ester compound as shown by formula (II), and at least one fatty acid which has from 11 to 35 carbon atoms have improved still durability, especially in respect of still durability under low temperature conditions. This invention is based upon this discovery.

Any of the fatty acid ester compounds represented by formula (I) indicated below can be used in the invention.

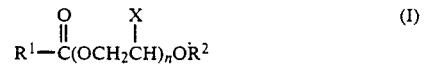

wherein R$^1$ represents a linear or branched chain hydrocarbon group which has from 11 to 35 carbon atoms, R$^2$ represents a linear or branched chain hydrocarbon group which has from 1 to 8 carbon atoms or a phenyl group, X represents a hydrogen atom or a methyl group, and n represents an integer of value from 2 to 200.

In formula (I), R$^1$ preferably represents a linear or branched chain hydrocarbon group which has from 11 to 21 carbon atoms and X is preferably a hydrogen atom. Moreover, n is preferably an integer of value from 2 to 7.

The hydrocarbon group represented by R$^1$ or R$^2$ may have a substituent. Examples of the substituent include a halogen atom (e.g., F, Cl, Br, I), an alkoxy group having from 1 to 5 carbon atoms, and a cyano group.

Actual examples of R$^1$ include linear or branched chain alkyl groups, such as undecyl, dodecyl, tridecyl, tetradecyl, pentadecyl, hexadecyl, heptadecyl, octadecyl, nonadecyl, eicosyl, heneicosyl, docosyl, tricosyltetracosyl, tetraacontyl groups etc.; or a linear or branched chain alkenyl group, such as an undecenyl, dodecenyl, tridecenyl, tetradecenyl, pentadecenyl, hexadecenyl, heptadecenyl, octadecenyl, nonadecenyl, eicosenyl, heneicosenyl, docosenyl, tricosyltetracosenyl, tetraacontynyl groups etc.

Actual examples of R$^2$ include linear or branched chain alikyl or alkenyl groups, such as methyl, ethyl, propyl, butyl, butenyl, pentyl, pentenyl, hexyl, hexenyl, heptyl, heptenyl, octyl, octenyl groups etc., and a phenyl group.

Actual examples of fatty acid ester compounds which can be represented by formula (I) are indicted below:

 (1)

 (2)

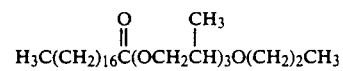 (3)

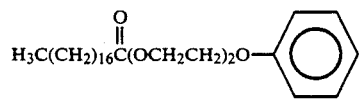 (4)

 (5)

 (6)

The compound (6) above can be prepared from isostearic acid.

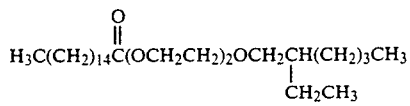 (7)

 (8)

 (9)

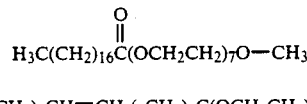 (10)

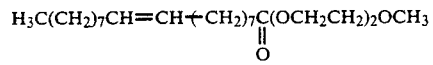 (11)

The double bond in the compound (11) above as a cis form.

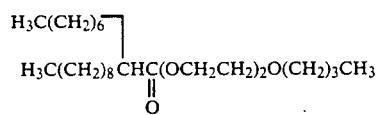 (12)

Any of the compounds represented by formula (II) indicated below can be used in the invention.

$$R^3-\overset{O}{\underset{\|}{C}}-O-R^4 \quad (II)$$

wherein $R^3$ represents a linear or branched chain hydrocarbon group which has from 11 to 35 carbon atoms and $R^4$ represents a linear or branched chain hydrocarbon group which has from 1 to 8 carbon atoms.

In formula (II), $R^3$ is preferably a linear or branched chain hydrocarbon group of carbon number from 11 to 21, and $R^4$ is preferably branched chain hydrocarbon group which has from 1 to 6 carbon atoms.

Actual examples of the $R^3$ group include linear or branched chain alkyl groups, such as undecyl, dodecyl, tridecyl, tetradecyl, pentadecyl, hexadecyl, heptadecyl, octadecyl, nonadecyl, eicosyl, heneicosyl, docosyl, tricosyltetracosyl, tetraacontyl groups etc., and linear or branched chain alkenyl groups, such as undecenyl, dodecenyl, tridecenyl, tetradecenyl, pentadecenyl, hexadecenyl, heptadecenyl, octadecenyl, nonadecenyl, eicosenyl, heneicosenyl, docosenyl, tricosyltetracosenyl, tetraacontynyl groups etc.

Furthermore, actual examples of the $R^4$ group include linear or branched chain alkyl and alkenyl groups, such as methyl, ethyl, propyl, butyl, butenyl, pentyl, pentenyl, hexyl, hexenyl, heptyl, heptenyl, octyl, octenyl groups etc., and the penenyl tgroup., Actual examples of fatty acid ester compounds which can be represented by formula (II) are indicated below:

 (13)

 (14)

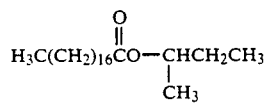 (15)

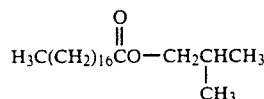 (16)

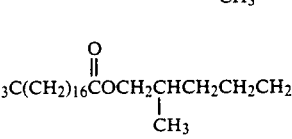 (17)

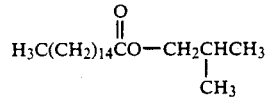 (18)

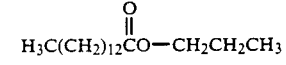 (19)

 (20)

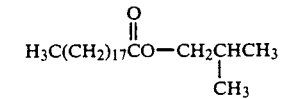 (21)

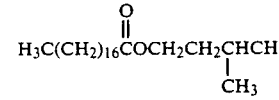 (22)

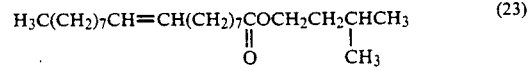 (23)

The double bond in the above mentioned compound is in the cis form.

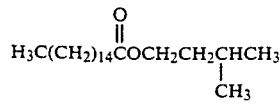

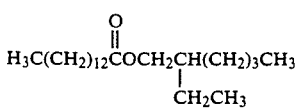

Of these compounds, those in which $R^4$ in formula (II) is a branched hydrocarbon group have a pronounced effect on the running durability in particular, and those in which the branched hydrocarbon group of $R^4$ is branched at the position of the terminal carbon atom have an especially pronounced effect.

Moreover, the raw materials of the fatty acid ester compounds represented by formulae (I) and (II) are often natural substances. Hence there are cases in which, among the examples shown above, there are included compounds of which the hydrocarbon groups have different numbers of carbon atoms, and there are compounds which cannot be said to be single compositions. However, better running durability is often realized when compounds which have slightly different numbers of carbon atoms are included than when compounds which have a single composition are included. For example, those of the above mentioned compounds prepared using fatty acids originating from bovine fat as the raw material exhibit excellent properties.

The inclusion of a fatty acid which has from 11 to 35 carbon atoms in the magnetic layer of the magnetic recording media of this invention is essential. The inclusion of saturated fatty acids and unsaturated fatty acids which have from 16 to 22 carbon atoms is preferred. The conjoint use of at least one of the above mentioned saturated fatty acids and at least one of the above mentioned unsaturated fatty acids is especially desirable. It is possible to improve the still durability further in this way.

In a magnetic layer of this invention the fatty acid esters represented by formulae (I) and (II) and the above mentioned fatty acids which have 11 to 35 carbon atoms may be included uniformly in the magnetic layer, and they are especially effective when they are present at the surface of the magnetic layer.

In this invention the preferred method for including the above mentioned fatty acid ester compounds and the above mentioned fatty acid which have 11 to 35 carbon atoms in the magnetic layer is a simple process of addition to the magnetic coating composition which is used for magnetic layer coating purposes. However, methods in which the above mentioned fatty acid ester compounds are coated onto the surface of the magnetic layer after forming the magnetic layer can also be used.

When added to the magnetic coating composition initially, the total amount of the above mentioned fatty acid ester compounds and the fatty acid added is preferably from 0.01 to 10.0 wt% in total with respect to the amount of ferromagnetic powder in the magnetic coating composition. The addition of a total amount of 0.05 to 6.0 wt% with respect to the amount of ferromagnetic powder in the magnetic coating composition is especially desirable.

Furthermore, the proportions of the above mentioned fatty acid ester compounds and the fatty acids are preferably from 5:1 to 1:5 and more preferably from 1 to 1:2, (esters:fatty acids) by weight.

Moreover, the proportions of the fatty acid ester compounds represented by formula (I) and the fatty acid ester compounds represented by formula (II) are preferably from 20:1 to 1:4, and more preferably from 5:1 to 1:2 ((I):(II)) by weight.

When the above mentioned fatty acid ester compounds and the above mentioned fatty acid are coated on the surface of the magnetic layer then the total amount of the above mentioned fatty acid ester compounds and fatty acids coated is preferably from 1 to 500 mg/m², and most desirably it is from 5 to 150 mg/m².

The binding agent which is used in the magnetic layer of a magnetic recording material of this invention must be a polymer which has at least one type of polar group as indicated below.

wherein M is a hydrogen atom, Li, Na, K or $NR_4$ where R is a hydrogen atom or an alkyl group, and M' is a hydrogen atom, Li, Na, K, alkyl group or $NR_4$ where R is a hydrogen atom or an alkyl group. The alkyl group represented by M or M' preferably has from 1 to 5 carbon atoms.

Polyurethane resins, vinyl chloride copolymers and polyester resins are preferred as the polymers which have polar groups, and they can be used in combinations of two or more types.

As the polymers having polar groups, those having a number average molecular weight of from about 20,000 to 50,000 and a weight average molecular weight of from about 40,000 to 120,000 are preferred.

The above mentioned polar groups are preferably introduced into the polymer at a rate of from $10^{-6}$ to $^{-3}$ equivalent, and most desirably at a rate of from $^{-5}$ to $^{-4}$ equivalent, per gram of polymer.

It is thought that the effect of using a polymer which has the above mentioned polar groups is as follows: Thus, wetting of the ferromagnetic powder by the polymer is facilitated by the use of the above mentioned polymers and, as a result of this, the dispersibility of the ferromagnetic powder is improved. Hence, the extent to which the above mentioned fatty acid esters and fatty acids are adsorbed on the ferromagnetic powder is slight and it is possible for them to realize their full lubricating action satisfactorily.

Resins other than that having polar groups according to this invention such as thermoplastic resins, thermoset resins and reactive type resins can be used as well as the above mentioned polymers which have polar groups as binding agents for forming the magnetic layers of this invention.

The weight ratio of the polymer having polar groups to the resins other than that having polar groups according to this invention is preferably from about 1:1 to 1:4, and more preferably from about 1:1 to 1:2.

Thermoplastic resins which can be used are, in general, those which have an average molecular weight of from 10,000 to 200,000 and a degree of polymerization of some 200 to 2,000. Examples of such thermoplastic resins include vinyl chloride/vinyl acetate copolymer resins (for example vinyl chloride/vinyl acetate copolymers, vinyl chloride/vinyl acetate/vinyl alcohol copolymers, vinyl chloride/vinyl acetate/maleic acid copolymers), vinyl chloride/vinylidene chloride copolymers, acrylic resins (for example vinyl chloride/ acrylonitrile copolymers, vinylidene chloride/acrylonitrile copolymers, (meth)acrylic acid ester/acrylonitrile copolymers, (meth)acrylic acid ester/vinylidene chloride copolymers, (meth)acrylic acid ester/styrene copolymers, butadiene/acrylonitrile copolymers), cellulose derivatives (for example cellulose acetate butyrate, cellulose diacetate, cellulose triacetate, cellulose propionate, cellulose acetate propionate, nitrocellulose, cellulose acetate), various synthetic rubber based thermoplastic resins (polybutadiene, chloroprene, polyisoprene, styrene/butadiene copolymers), polyurethane resins, poly(vinyl fluoride), polyamide resins, poly(vinyl butyrate), styrene/butadiene copolymers, and polystyrene resins etc., and these can be used individually or in the form of mixtures.

The thermoset resins and reactive resins which can be used are, in general, resins of average molecular weight less than 200,000 in the state in which they are coated, and which form resins of more or less infinite molecular weight by means of a condensation reaction or an addition reaction etc. after coating. In the case of the thermoset resins, those which do not soften or melt on heating during the course of hardening are preferred. Examples of such resins include phenol/formal in novolak resins, phenol/formal in resol resins, phenol/furfural reins, glycerine/formal in reins, urea resins melamine resins, drying oil modified alkyd resins, phenol resin modified alkyd resins, maleic acid resin modified alkyd resins, unsaturated polyester resins, combinations of epoxy resins and hardeners (for example polyamines, acid anhydrides, polyamide resins), terminal isocyanate polyether wet setting type resins, polyisocyanate prepolymers (for example compounds which have at least three isocyanate groups within the molecule which are the reaction products of diisocyanate and low molecular weight triols, trimers and tetramers of diisocyanates), and combinations of polyisocyanate prepolymers and resins which have active hydrogen atoms (for example polyester polyols, polyether polyols, acrylic acid copolymers, maleic acid copolymers, 2-hydroxyethyl methacrylate copolymers, p-hydroxystyrene copolymers), and these may be used individually or in the form of mixtures.

The above mentioned polymers which have polar groups of this invention are preferably used as mixtures with the isocyanate prepolymers (polyisocyanate compounds) described above. In this way it is possible to provide a tough film and improve the running durability.

The amount of binding agent used is generally from 10 to 100 parts by weight, and preferably from 20 to 40 parts by weight, per 100 parts by weight of the ferromagnetic powder.

No particular limitation is imposed on the ferromagnetic powder which is used in the invention. Examples of ferromagnetic powders include ferromagnetic alloy powders, fine ferromagnetic metal powders in which iron is the main component, powders based on metal oxides such as $\gamma$-$Fe_2O_3$ and $Fe_3O_4$, and modified metal oxide based ferromagnetic powders such as cobalt modified iron oxides, modified barium ferrites and modified strontium ferrites etc. Examples of fine ferromagnetic powders include the alloys in which the metal fraction in the powder is at least 75 wt%, and at least 80 wt% of this metal fraction comprises at least one ferromagnetic metal or alloy (for example Fr, Co, Ni, Fr-Co, Fe-Ni, Co-Ni, Co-Ni-Fe) and which contain another component accounting for not more than 20 wt% of the metal fraction (for example Al, Si, S, Sc, Ti, V, Cr, Mn, Cu, Zn, Y, Mo, Rh, Pd, Ag, Sn, Sb, Te, Ba, Ta, W, Re, Au, Hg, Pb, Bi, La, Ce, Pr, Nd, B, P). Furthermore, the above mentioned ferromagnetic metal fraction may also contain a small amount of water, hydroxides or oxides. Methods for the manufacture of these ferromagnetic metal powders are already well known and the ferromagnetic alloy powders used in the invention can be manufactured in accordance with these known methods.

No limitation is imposed on the form of the ferromagnetic powder which is used, but accicular, granular, dice shaped, rice grain shaped or tabular shaped powders are normally used. The specific surface area of the ferromagnetic powder is preferably at least 45 $m^2/g$ in respect of the electromagnetic conversion characteristics.

The inclusion in the magnetic layer of a magnetic recording material of this invention of inorganic particles of which the Mohs' hardness is at least 5 is desirable.

There is no limitation on the inorganic particles which can be used except that they should have a Mohs' hardness of at least 5. Examples of particles of which the Mohs' hardness is at least 5 include $Al_2O_3$ (Mohs' hardness 9), $TiO_2$ (Mohs' hardness 6.5), $SiO_2$ (Mohs' hardness 7), $SnO_2$ (Mohs' hardness 6.5), $Cr_2O_3$ (Mohs' hardness 9) and $\alpha$-$Fe_2O_3$ (Mohs' hardness 5.5)

The preferred inorganic particles are those which have a Mohs' hardness of at least 8. If comparatively soft inorganic particles which have a Mohs' hardness of less than 5 are used they are liable to be shed from the magnetic layer and head blockage is liable to occur since there is virtualy no abrasive effect on the head, and the running durability is also poor.

The inorganic particles content is normally from 0.1 to 20 parts by weight, and preferably from 1 to 10 parts by weight, per 100 parts by weight of the ferromagnetic powder.

Furthermore, the inclusion of a carbon black (especially a carbon black having an average particle size of 10 to 300 $\mu m$) in the magnetic layer as well as the inorganic particles mentioned above is desirable.

A method for the manufacture of magnetic recording media of this invention where the aforementioned fatty acid esters are added to the magnetic coating composition is described below.

When manufacturing the magnetic layer of a magnetic recording medium of this invention it is usual to form a magnetic coating composition by milling the ferromagnetic powder and binding agent, and the aforementioned fatty acid ester compounds and fatty acid, and the polishing material and other fillers etc. as required, together with a solvent.

The solvents normally used to form magnetic coating compositions, for example solvents such as methyl ethyl ketone, can be used as the solvent which is used during the milling process.

No special limitation is placed on the method of milling provided that it can normally be used to prepare magnetic coating compositions, and the order for the addition of the various components can be established suitably.

The usual milling machines, for example a two roll mill, three roll mill, ball mill, pebble mill, toron mill, side grinder, Segbary attriter, high speed impeller dispersion machine, high speed stone mill, high speed impact mill, disper, kneader, high speed mixer, homogenizer or an ultrasonic dispersing machine etc., can be used to prepare the magnetic coating composition.

Known additives such as dispersing agents and antistatic agents etc. can be used conjointly when preparing the magnetic coating composition.

The known dispersing agents such as lecithin etc. can be used for example as dispersing agents. When a dispersing agent is used it is normally included at a rate of from 0.1 to 10 parts by weight per 100 parts by weight of the binding agent which is being used.

Fine electrically conductive powders such as carbon black, carbon black graphite polymers etc., natural surfactants such as saponin etc., nonionic surfactants such as the alkyleneoxides, glycerine and glycidol based surfactants, cationic surfactants such as the quaternary ammonium salts, salts of pyridine and other heterocyclic compounds, phosphonium compounds and sulfonium compounds, anionic surfactants which contain an acid group, such as carboxylic acids, sulfonic acids, phosphoric acids, sulfate ester groups, phosphate ester groups, etc., and amphoteric surfactants such as amino acids, aminosulfonic acids, and the sulfate or phosphate esters of amino alcohols etc., can be used as antistatic agents. When the above mentioned fine electrically conductive powders are used as antistatic agents there are used for example in an amount from 0.1 to 10 parts by weight par 100 parts by weight of the binding agent, and when the surfactants are used for this purposes they are used in an amount from 0.12 to 10 parts by weight per 100 parts by weight of the binding agent.

Furthermore, the known solid lubricants such as fine graphite powder, fine molybdenum disulfide powder, fine teflon powder and the higher alcohol which have from 3 to 30 carbon atoms, sobitane oleate, mineral oils, animal and vegetable oils, low olefin polymers, and low α-olefin polymers etc. can be used conjointly as lubricants with the aforementioned fatty acid ester compounds and fatty acids of this invention.

Moreover, the additives such as the dispersing agents and antistatic agents described above are not limited to having just the effect described and, for example, a dispersing agent can also function as an antistatic agent. Hence, the effect of a compound indicated in the above classifications is not limited to just the classification under which it is listed. Furthermore, the amount of a substance which has a plurality of actions which is added is determined in conjunction with the various effects of that substance.

The magnetic coating composition which has been prepared in this way is coated onto the non magnetic support as described earlier. The coating can be carried out directly onto the support or the magnetic coating composition can be coated onto the non-magnetic support via an adhesive layer for example.

Air doctor coating, blade coating, rod coating, extrusion coating, air knife coating, squeeze coating, dip coating, reverse roll coating, transfer roll coating, gravure coating, kiss coating, cast coating, spray coating and spin coating etc. can be used for coating the non-magnetic support, and other methods besides these methods can also be used. The thickness of the magnetic layer coated in this way is, after drying, generally from about 0.5 to 10 μm, and the thickness of the dry coating is normally from 1.5 to 7.0 μm.

When the magnetic layer which has been coated onto the non-magnetic support is to be used as a magnetic recording tape, the layer is normally dried after carrying out a process in which the ferromagnetic powder in the magnetic layer is orientated, which is to say after carrying out a magnetic field orientation process. Furthermore, the surface can be subjected to a smoothing treatment as required. The magnetic recording medium is cut up into the prescribed form after the execution of a surface smoothing treatment etc.

Examples of the invention and comparative examples are shown below, but this invention is not construed as being limited thereto. In these examples the term "parts" signifies "parts by weight".

EXAMPLE 1

The composition indicated below was milled and dispersed over a period of 48 hours using a ball mill, and then 10 parts of polyisocyanate was added and the mixture was milled for a further period of 1 hour. The mixture was then filtered through a filter of uniform pore diameter 1 μm to provide a magnetic coating composition. The magnetic coating composition so obtained was coated onto the surface of a polyethylenedrying, terephthalate support of thickness 10 μm in such a way as to provide a thickness after drying of 4.0 μm.

| Magnetic Coating Composition | |
|---|---|
| Magnetic metal powder (Composition Fe; specific surface area 50 mg/m$^2$) | 140 parts |
| Vinyl chloride based copolymer A (vinyl chloride: 77 wt %, —SO$_3$H groups: 0.8 wt %, Epoxy groups: 3.9 wt %, Hydroxyl groups: 0.5 wt %, Polymerization degree: 400) | 10 parts |
| Polyester based polyurethane resin A (Condensed polyester, Weight average molecular weight 40,000, Polar groups: an average of two —SO$_3$Na groups per molecule, Number average molecular weight: 25,000, Initial elastic modulus: 100 kg/mm$^2$, Breaking strength: 8 kg/mm$^2$, Elongation at break: 150%) | 8 parts |
| α-Alumina (average particle size 0.2 μm) | 10 parts |
| Oleic acid | 0.5 part |
| Myristic acid | 1.0 part |
| Stearic acid | 0.5 part |
| Fatty acid ester compound (1) | 1.0 part |
| Fatty acid ester compound (22) | 0.7 part |
| Carbon black (average particle size 40 μm) | 2 parts |
| Methyl ethyl ketone | 300 parts |

The non-magnetic support which had been coated with the magnetic coating composition was subjected to magnetic field orientation with a magnet of 3,000 gauss in a state in which the magnetic coating composition had not dried, and then the coating composition was dried. The resulting material was cut into strips half an inch wide using a super cutting treatment to provide half inch video tapes. The above mentioned fatty acid ester compounds (1) and (22) had the structures indicated below.

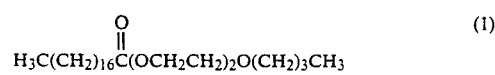

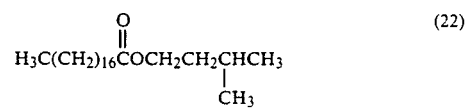

EXAMPLE 2

Half inch video tapes were made in the same way as in Example 1 except that all the fatty acid, namely 0.5 part of oleic acid, 1.0 part of myristic acid and 0.5 part of stearic acid, in Example 1 was replaced by 2.0 parts of stearic acid.

EXAMPLE 3

Half inch video tapes were made in the same way as in Example 1 except that all of the fatty acid in Example 1 was replaced by 2.0 parts of oleic acid.

EXAMPLE 4

Half inch video tapes were made in the same way as in Example 1 except that all of the above mentioned fatty acid in Example 1 was replaced by 0.5 part of oleic acid, 1.0 part of stearic acid and 0.5 part of behenic acid.

EXAMPLE 5

Half inch video tapes were made in the same way as in Example 4 except that the fatty acid ester compound (22) in Example 4 was replaced by the fatty acid ester compound (18) mentioned below.

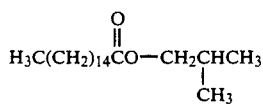  (18)

EXAMPLE 6

Half inch video tapes were made in the same way as in Example 4 except that the 0.7 part of the fatty acid ester compound (22) in Example 4 was replaced by 0.35 part of the fatty acid ester compound (21) and 0.35 part of the fatty acid ester compound (24) mentioned below.

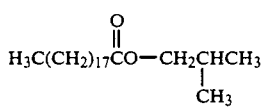  (21)

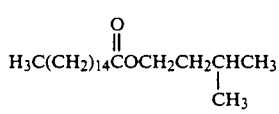  (24)

EXAMPLE 7

Half inch video tapes were made in the same way as in Example 1 except that the fatty acid ester compound (22) in Example 1 was replaced by the fatty acid ester compound (23) mentioned below.

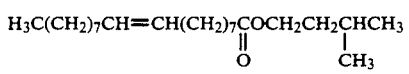  (23)

The double bond in the compound (23) above is in the cis form.

EXAMPLE 8

Half inch video tapes were made in the same way as in Example 4 except that the fatty acid ester compound (1) in Example 4 was replaced with the fatty acid ester compound (3) mentioned below.

  (3)

EXAMPLE 9

Half inch video tapes were made in the same way as in Example 4 except that the fatty acid ester compound (1) in Example 4 was replaced with the fatty acid ester compound (11) mentioned below, and the 0.7 part of the fatty acid ester compound (22) was replaced by 0.35 part of the fatty acid ester compound (21) and 0.35 part of the fatty acid ester compound (24).

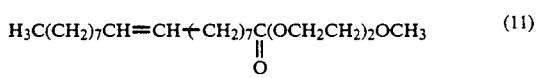  (11)

The double bond in the compound (11) above is in the cis form.

EXAMPLE 10

Half inch video tapes were made in the same way as in Example 4 except that the fatty acid ester compound (1) in Example 4 was replaced by the fatty acid ester compound (10) mentioned below, and the polyester based polyurethane resin A was replaced by the polyester based polyurethane resin C indicated below.

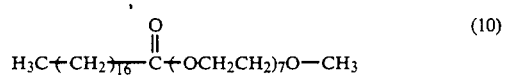  (10)

The above mentioned polyester based polyurethane resin C was as follows:

Condensed polyester, Weight average molecular weight: 40,000, Polar groups: an average of 1.5 —COOH groups per molecule, Number average molecular weight: 25,000, Initial elastic modulus: 100 kg/mm$^2$, Breaking strength: 8 kg/mm$^2$, Elongation at break: 150%.

EXAMPLE 11

Half inch video tapes were made in the same way as in Example 1 except that the fatty acid ester compound (1) in Example 1 was replaced by the fatty acid ester compound (11) and the vinyl chloride based copolymer A was replaced by the vinyl chloride based copolymer B indicated below.

The above mentioned vinyl chloride based copolymer B was as follows:

Vinyl chloride/vinyl acetate/vinyl alcohol copolymer (Degree of polymerization: 400, vinyl chloride 80 wt%, vinyl acetate 15 wt%, vinyl alcohol 5 wt%)

EXAMPLE 12

Half inch video tapes were made in the same way as in Example 1 except that the fatty acid ester compound (1) in Example 1 was replaced by the fatty acid ester compound (12), the fatty acid ester compound (22) was replaced by the fatty acid ester compound (23), the vinyl chloride based copolymer A was replaced by the vinyl chloride based copolymer B and the polyester based polyturethane resin A was replaced by the polyester based polyurethane resin C.

COMPARATIVE EXAMPLE 1

Half inch video tapes were made in the same way as in Example 1 except that all of the above mentioned fatty acid in Example 1 were replaced by 2.0 parts of stearic acid and none of the fatty acid ester compound (1) was added.

COMPARATIVE EXAMPLE 2

Half inch video tapes were made in the same way as in Example 1 except that none of the fatty acid ester compound (1) used in Example 1 was added

COMPARATIVE EXAMPLE 3

Half inch video tapes were made in the same wa as in Example 1 except that the vinyl chloride based copolymer A in Example 1 was replaced by the vinyl chloride based copolymer B and the polyester based polyurethane resin A was replaced with the polyester based polyurethane resin B mentioned below.

The above mentioned polyester based polyurethane resin B was as follows:

Condensed polyester, Weight average molecular weight: 40,000, Number average molecular weight: 25,000, Initial elastic modulus: 100 k /mm$^2$ Breaking strength: 8 kg/mm$^2$, elongation at break: 150%.

The video tapes obtained in the ways indicated above were tested using the methods of evaluation described below.

Methods of Evaluation

Head Blockage

The video tapes obtained were subjected to recording/play back along the full length of a tape of 1 hour length under conditions of high humidity, 80% RH, at a temperature of 25-° C. using a VHS-VTR (NV8200, made by the Matsushita electric Industries Co., Ltc.). The number of occurrences of head blockage per hour was then calculated from the video head blockages which occurred during this time and the evaluation was made in terms of this number of occurrences.

Still Durability

The video tapes obtained were played back after (Mohs' hardness 9), Ti02 (Mohs' hardness 6.5), Si02 recording on the above mentioned VHS-VTR, the system was switched to the still mode during play back, and the time elapsing before the head output fell to one half of that at the commencement of the still play back was measured.

The above mentioned measurements were made at both 0° C. and 10° C.

The compositions of the examples described above are shown in Table 1 and the results of the evaluations carried out in each case are shown in Table 2.

TABLE 1

| | Vinyl chloride based resin | Urethane Resin | Fatty Acid Ester (I) | (II) | Fatty Acid | | |
|---|---|---|---|---|---|---|---|
| Example 1 | A | A | (1) | (22) | OA | MA | SA |
| Example 2 | A | A | (1) | (22) | | SA | |
| Example 3 | A | A | (1) | (22) | | OA | |
| Example 4 | A | A | (1) | (22) | OA | SA | BA |
| Example 5 | A | A | (1) | (18) | OA | SA | BA |
| Example 6 | A | A | (1) | (21/24) | OA | SA | BA |
| Example 7 | A | A | (1) | (23) | OA | MA | SA |
| Example 8 | A | A | (3) | (22) | OA | SA | BA |
| Example 9 | A | A | (11) | (21/24) | OA | SA | BA |
| Example 10 | A | C | (10) | (22) | OA | SA | BA |
| Example 11 | B | A | (11) | (22) | OA | MA | SA |
| Example 12 | B | C | (12) | (23) | OA | MA | SA |
| Comparative Example 1 | A | A | — | (22) | | SA | |
| Comparative Example 2 | A | A | — | (22) | OA | MA | SA |
| Comparative Example 3 | B | B | (1) | (22) | OA | MA | SA |

The abbreviations used for the fatty acids in Table 1 are as follows.
OA: Oleic acid
MA: Myristic acid
SA: Stearic acid
BA: Behenic acid

TABLE 2

| | Blocking (times/hour) | Still Durability (minutes) 0° C. | 10° C. |
|---|---|---|---|
| Example 1 | None | 30< | 30< |
| Example 2 | None | 20 | 25 |
| Example 3 | 1 to 5 | 25< | 30< |
| Example 4 | None | 30< | 30< |
| Example 5 | None | 30< | 30< |
| Example 6 | None | 30< | 30< |
| Example 7 | None | 30< | 30< |
| Example 8 | None | 30< | 30< |
| Example 9 | None | 30< | 30< |
| Example 10 | None | 30< | 30< |
| Example 11 | None | 30< | 30< |
| Example 12 | None | 30< | 30< |
| Comparative Example 1 | 25 to 35 | 1> | 10 |
| Comparative Example 2 | 15 to 25 | 2 | 15 |
| Comparative Example 3 | 15 to 25 | 1> | 6 |

It is clear from Tables 1 and 2 that still durability and blockage are improved by the conjoint use of the two types of fatty acid ester and fatty acids of this invention. Moreover, it is clear from Examples 2 and 3 in which one fatty acid is used conjointly and from the other examples in which saturated and unsaturated fatty acids are used conjointly that still durability and blockage are further improved by the conjoint use of the two types of fatty acid mentioned above.

On the other hand, in Comparative Examples 1 and 2 where just the usual fatty acid ester is used the above mentioned performance is inadequate irrespective of the number and type of fatty acid(s) used.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a nonmagnetic support having provided thereon a magnetic layer comprising a ferromagnetic powder dispersed in a binder,
   wherein said binder comprises a polymer containing a polar group selected from —SO$_3$M, —OSO$_3$M, —COOM, $$-\underset{\underset{O}{\|}}{P}(OM')_2 \text{ and } -O\underset{\underset{O}{\|}}{P}(OM')_2,$$

where M represents a a hydrogen atom, Li, Na, K or NR$_4$ were R represents a hydrogen atom or an alkyl group, and M' represents a hydrogen atom, Li, Na, K, an alkyl group or NR$_4$ where R represents a hydrogen atom or an alkyl group, and said magnetic layer contains at least one fatty acid ester compound represented by formula (I), at least one fatty acid ester compound represented by formula (II), and at least one fatty acid having from 11 to 35 carbon atoms, wherein said formula (I) is:

$$R^1-\underset{\underset{O}{\|}}{C}(OCH_2\overset{\overset{X}{|}}{C}H)_nOR^2 \qquad (I)$$

where R$^1$ represents a linear or branched chain hydrocarbon group having from 11 to 35 carbon atoms, R$^2$ represents a linear or branched chain hydrocarbon group having from 1 to 8 carbon atoms or a phenyl group, X represents a hydrogen atom or a methyl group, and n represents an integer of from 2 to 200 and wherein said formula (II) is:

$$R^3-\underset{\underset{O}{\|}}{C}-O-R^4 \qquad (II)$$

where R$_3$ represents a linear or branched chain hydrocarbon group having from 11 to 35 carbon atoms and R$^4$ represents a linear or branched chain hydrocarbon group having from 1 to 8 carbon atoms.

2. A magnetic recording medium as claimed in claim 1, wherein said branched chain hydrocarbon group is branched at the position of the terminal carbon atom.

3. A magnetic recording medium as claimed in claim 1, wherein said magnetic layer contains said fatty acid ester compounds and said fatty acid in a total amount of from about 0.01 to 10.0 wt% based on the amount of said ferromagnetic powder.

4. A magnetic recording medium as claimed in claim 1, wherein the weight ratio of said fatty acid ester compound represented by formula (I) to said fatty acid ester compound represented by formula (II) is in the range of from about 20:1 to 1:4.

5. A magnetic recording medium as claimed in claim 1, wherein the weight ratio of the total amount of said fatty acid ester compounds to said fatty acid is in the range of from about 2:1 to 1:2.

6. A magnetic recording medium as claimed in claim 1, wherein said polymer is selected for the group consisting of a polyurethane resin, a vinyl chloride copolymer and a polyester resin.

7. A magnetic recording medium as claimed in claim 1, wherein said polymer contains said polar group in an amount of from about $1 \times 10^{-6}$ to $1 \times 10^{-3}$ equivalent/g.

* * * * *